(12) United States Patent
Shenoy et al.

(10) Patent No.: US 8,020,617 B2
(45) Date of Patent: Sep. 20, 2011

(54) WELL TREATMENT TO INHIBIT FINES MIGRATION

(75) Inventors: Sudhir Shenoy, Houston, TX (US); Mehmet Parlar, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 464 days.

(21) Appl. No.: 12/194,818

(22) Filed: Aug. 20, 2008

(65) Prior Publication Data

US 2009/0065207 A1 Mar. 12, 2009

Related U.S. Application Data (60) Provisional application No. 60/971,455, filed on Sep. 11, 2007.

(51) Int. Cl.
 *E21B 43/04* (2006.01)
(52) U.S. Cl. ......... 166/278; 166/279; 166/293; 166/300
(58) Field of Classification Search ........................ None
See application file for complete search history.

(56) References Cited

U.S. PATENT DOCUMENTS

| | | | |
|---|---|---|---|
| 3,692,676 A | 9/1972 | Culter et al. | |
| 3,937,283 A | 2/1976 | Blauer et al. | |
| 4,695,389 A | 9/1987 | Kubala | |
| 4,725,372 A | 2/1988 | Teot | |
| 5,175,278 A | 12/1992 | Peik et al. | |
| 5,551,516 A | 9/1996 | Norman | |
| 5,620,946 A * | 4/1997 | Jahnke et al. | ................. 507/131 |
| 5,887,653 A | 3/1999 | Bishop | |
| 5,964,295 A | 10/1999 | Brown | |
| 5,979,555 A | 11/1999 | Gadberry | |
| 5,979,557 A | 11/1999 | Card | |
| 6,140,277 A | 10/2000 | Tibbles | |
| 6,258,859 B1 | 7/2001 | Dahayanake | |
| 6,435,277 B1 | 8/2002 | Qu et al. | |
| 6,437,040 B2 | 8/2002 | Anthony | |
| 6,509,301 B1 | 1/2003 | Vollmer | |
| 6,703,352 B2 | 3/2004 | Dahayanake | |
| 6,762,154 B2 | 7/2004 | Lungwitz | |
| 6,787,506 B2 | 9/2004 | Blair | |
| 6,857,485 B2 | 2/2005 | Patel | |
| 7,060,661 B2 | 6/2006 | Dobson, Sr. et al. | |
| 7,084,092 B2 | 8/2006 | Patel | |
| 7,084,095 B2 | 8/2006 | Lee et al. | |
| 7,192,907 B2 | 3/2007 | Patel | |
| 7,303,018 B2 | 12/2007 | Cawiezel et al. | |
| 2002/0092681 A1 | 7/2002 | Patel | |
| 2004/0209780 A1 | 10/2004 | Harris et al. | |
| 2004/0220058 A1 | 11/2004 | Eoff | |
| 2005/0137095 A1 | 6/2005 | Cawiezel et al. | |

FOREIGN PATENT DOCUMENTS

WO 9856497 12/1998

* cited by examiner

*Primary Examiner* — Zakiya W. Bates
(74) *Attorney, Agent, or Firm* — David G. Matthews; Rodney V. Warfford (57) ABSTRACT

A method of treating a formation with a well treatment fluid comprising a clay stabilizer comprising a polyamine ether before or during a well treatment such as cleanup, gravel packing, fracturing, or the like. The stabilizer can continue to inhibit fines migration in the treatment zone even after an aqueous fluid without the stabilizer, e.g. a production fluid or injection fluid, displaces the original treatment fluid. When the stabilizer is used in a viscoelastic system (VES) with an acid blend component, the viscosity of the VES is essentially unchanged relative to the VES alone without the stabilizer.

26 Claims, 2 Drawing Sheets

WELL TREATMENT TO INHIBIT FINES MIGRATION

CROSS REFERENCE TO RELATED APPLICATION(S)

This application claims the benefit of and priority to U.S. 60/971,455, filed Sep. 11, 2007.

BACKGROUND OF THE INVENTION

The statements in this section merely provide background information related to the present disclosure and may not constitute prior art.

This invention relates to treating subterranean formations penetrated by a wellbore and in particular to the inhibition of fines migration in the completion, stimulation and other treatment operations involving subterranean formations.

Viscous fluids play many important roles in oilfield service applications, for instance in gravel packing placement. Gravel packing essentially consists of placing a gravel pack around the perimeter of a wellbore across the production zone to minimize sand production from highly permeable formations.

Solid suspension properties are also an important requirement for fracturing fluids. For a well to produce hydrocarbons from a subterranean geologic formation, the hydrocarbons have to follow a sufficiently unimpeded flow path from the reservoir to the wellbore. If the formation has relatively low permeability, either naturally or through formation damages resulting for example from addition of treatment fluids or the formation of scales, it can be fractured to increase the permeability. Fracturing involves literally breaking a portion of the surrounding strata, by injecting a fluid directed at the face of the geologic formation, at pressures sufficient to initiate and/or extend a fracture in the formation. A fracturing fluid typically comprises a proppant, such as ceramic beads or sand to hold the fracture open after release of hydraulic pressure. It is therefore important for the fluid to be viscous enough to carry the proppant into the fracture.

Water-soluble polymers, such as polysaccharide derivatives, are the most commonly used additives to obtain fluid viscosity. Viscosity may also be obtained using viscoelastic surfactants. Unlike the polymers, viscoelastic surfactant based fluids do not lead to reduction of permeability due to solid deposits, and exhibit lower friction pressure. In addition, the viscosity of the fluid is reduced or lost upon exposure to formation fluids such as for instance crude oil thereby ensuring better fracture clean-up.

The normal preparation of viscoelastic surfactant fluids includes mixing in appropriate amounts suitable surfactants such as anionic, cationic, nonionic and zwitterionic surfactants. The viscosity of viscoelastic surfactant fluids is attributed to the three dimensional structure formed by the components in the fluids. When the concentration of surfactants in a viscoelastic fluid significantly exceeds a critical concentration, and in most cases in the presence of an electrolyte, surfactant molecules aggregate into species such as micelles, which can interact to form a network exhibiting elastic behavior. In this specification and claims, "micelle" is a generic term for the organized interacting species.

Cationic viscoelastic surfactants—typically consisting of long-chain quaternary ammonium salts such as cetyltrimethylammonium bromide (CTAB)—have been of interest in wellbore fluids. Common reagents that generate viscoelasticity in the surfactant solutions are salts such as ammonium chloride, potassium chloride, sodium salicylate and sodium isocyanate and non-ionic organic molecules such as chloroform. The electrolyte content of surfactant solutions is also an important control on their viscoelastic behavior. However, fluids comprising this type of cationic viscoelastic surfactants usually tend to lose viscosity at high brine concentration (10 pounds per gallon or more). Therefore, these fluids have seen limited use as gravel-packing fluids or drilling fluids, or in other applications requiring heavy fluids to balance well pressure.

Amphoteric or zwitterionic surfactants and an optional organic acid, salt and/or inorganic salt may be used impart viscoelastic properties. The surfactants are for instance dihydroxyl alkyl glycinate, alkyl ampho acetate or propionate, alkyl betaine, alkyl amidopropyl betaine and alkylamino mono- or di-propionates derived from certain waxes, fats and oils. The surfactants work in conjunction with an inorganic water-soluble salt or organic additive such as phthalic acid, salicylic acid or their salts. Amphoteric/zwitterionic surfactants, in particular those comprising a betaine moiety are useful at temperature up to about 150° C. and are therefore of particular interest for medium to high temperature wells. However, like the cationic viscoelastic surfactants mentioned above, they are not generally compatible with high brines, i.e. brine with a saline content such that the density is 1.2 g/mL (10 lb/gal) or more.

Sodium dodecylbenzenesulfonate (SDBS) may be used with amphoteric or zwitterionic surfactants to viscosify high brines. One embodiment of a zwitterionic surfactant comprises a betaine moiety and an oleic acid moiety, such as the surfactant in BET-O-30 (Rhodia). The oleic acid stock from which the oleic acid moiety is derived is generally about 75% pure to about 85% pure, and the balance of the stock comprises other fatty acids, such as linolic acid, linoleic acid, etc. Some of these other fatty acids may be present in about 15% to about 25% of the molecules of the surfactant in place of the oleic acid.

In various oilfield stimulation applications, fines migration can cause formation damage leading to a loss of productivity of a well. Fines migration can affect fracturing, matrix acidizing and sand control operations in well services, and thus the art has attempted to prevent potential formation damage. A common approach for fines stabilization is to use potassium chloride, ammonium chloride, tetramethyl ammonium chloride, and the like; however, these additives only provide temporary protection from fines migration. After the treatment is completed, the well placed into production and the original treatment fluid is displaced and the temporary stabilizer removed, the fines can resume migration and eventually damage the formation and reduce the production rates.

Permanent fines inhibitors may require multiple treatment steps and/or rigorously controlled treatment conditions and protocols, are can be time consuming, complicated and expensive. There is a need in the art for a simple and cost-effective treatment method to more permanently inhibit and control fines migration.

Drilling fluids used to form boreholes in shale or clay deposits have been stabilized using various shale stabilizers. In some cases, polyamines and polyol compounds are used to stabilize water-sensitive solids during drilling operations. On the other hand, especially where the wellbores are cased, there is no need for permanent stabilization or the inhibition of fines migration by a drilling fluid. Moreover, it is known that the use of amine compounds can have a deleterious effect on the rheology of viscoelastic surfactant systems.

SUMMARY OF THE INVENTION

In embodiments of the invention, a clay stabilizer comprising a polyamine inhibits fines migration during completion, stimulation or other post-drilling well operations and methods. In one embodiment, fines inhibition can be on a permanent or essentially permanent basis so that formation damage does not occur for a period of time after removal of the treatment fluid containing the polyamine from the treatment zone of the formation and introduction of a displacement fluid. In one embodiment, a viscoelastic surfactant viscosifies the treatment fluid containing the polyamine stabilizer, e.g. using an acid pH modifier, such that the rheology of the viscoelastic surfactant is essentially unchanged by the presence of the polyamine.

In one embodiment, the invention can provide a method for flowing fluid through a subterranean formation penetrated by a wellbore and containing water-sensitive minerals. The method can include the steps of: contacting a permeable treatment zone in fluid communication between the wellbore and a production zone of the formation with a saline treatment fluid comprising a poly(oxyalkylene)polyamine clay inhibitor for a period of time effective to inhibit fines migration in the treatment zone; and thereafter displacing a second fluid through the treatment zone between the wellbore and the formation, wherein the second fluid entering the treatment zone comprises an aqueous phase essentially free of the inhibitor.

In an embodiment, the clay inhibitor can comprise a diamine ether of the formula $H_2-N-R-(O-R')x-NH_2$ wherein R and R' are alkylene of from 1 to 6 carbon atoms and x has a value from 1 to 10, or an acid addition product thereof. In an embodiment, the clay inhibitor can comprise a diamine ether of the formula:

or an acid addition product thereof.

In an embodiment, the treatment fluid can comprise the clay inhibitor in an amount from about 0.1 to 10 weight percent, by weight of the liquid phase.

In an embodiment, the treatment fluid can be neutralized with an acid to a pH from about 6 to about 8.5.

In an embodiment, the treatment fluid can have a density of at least about 1.2 g/mL. In embodiments, the treatment fluid can comprise potassium chloride, tetramethyl ammonium chloride, or the like, or a combination thereof.

In an embodiment, the treatment fluid can comprise a zwitterionic surfactant of the formula:

wherein R1 is an alkyl, alkylarylakyl, alkoxyalkyl, alkylaminoalkyl or alkylamidoalkyl group, containing from about 12 to about 24 carbon atoms, branched or straight chains, saturated or unsaturated, and R2 and R3 are independently hydrogen or an aliphatic chain having from 1 to about 30 carbon atoms, and R4 is a hydrocarbyl radical having from 1 to 4 carbon atoms. In an embodiment, the treatment fluid can comprise a zwitterionic surfactant comprising a betaine moiety and an oleic acid moiety. In another embodiment, the treatment fluid can comprise a cationic surfactant. In an embodiment, the treatment fluid can comprise from 0.01 to 2 weight percent of a surfactant by total weight of the liquid phase.

In an embodiment, the method can further comprise hydraulically fracturing the formation, placing gravel adjacent the formation, removing scale from adjacent the formation, removing mud cake from adjacent the formation, treating the formation between drilling and gravel placement, or a combination thereof. In an embodiment, the treatment fluid can comprise a prepad or preflush in an operation to treat the formation.

In an embodiment, the method can comprise soaking the treatment zone in contact with the treatment fluid for a period of at least one hour.

In an embodiment, the treatment fluid can be prepared by mixing the inhibitor with an aqueous medium and salt. In another embodiment, the treatment fluid can be prepared by mixing the inhibitor with an aqueous medium, salt and an acid.

DESCRIPTION OF THE INVENTION

Paragraph headings. In the following discussion bold-faced font is used for paragraph headings, which are intended merely for organization and to facilitate reading of the disclosure. However, the paragraph headings are not meant to limit the scope of the disclosure.

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited.

In the summary of the invention and this description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that inventors appreciate and understand that any and all data points within the range are to be considered to have been specified, and that inventors have disclosed and enabled the entire range and all points within the range.

As used herein, a reservoir is a permeable fluid-containing region of a formation in fluid communication with a wellbore via a treatment zone of interest wherein reservoir fluid can be depleted by producing reservoir fluid to the wellbore, accumulated by injection of fluid into the reservoir, e.g. by injection via the wellbore, sometimes by displacement and/or permeation of fluid through the treatment zone, or a combination thereof. Depletion of a reservoir fluid is known as production, whereas accumulation of fluid into the reservoir, i.e. negative production, is known as injection.

This invention relates to fluids and methods used to treat a subterranean formation, and in particular, the invention relates to the use of polyamines such as polyamine ethers to inhibit water damage to water sensitive formations. The invention in one embodiment is an improvement over the existing art by providing a single fluid treatment that can inhibit water sensitivity. In an unexpected discovery, the use of a polyamine ether in one embodiment essentially permanently or at least tenaciously inhibits water sensitivity so that water damage and fines migration continues to be inhibited after the original treatment fluid is infiltrated or displaced by formation fluid or another treatment fluid.

Stabilizing additive. In some embodiments of the invention, a clay stabilizing additive can be added to a treatment fluid such as, for example, a brine used in a gravel pack or in an aqueous medium for use in a fracturing fluid, such that when the treatment fluid leaks off into the formation or is flowed back to the wellbore, the additive has apparently reacted with the formation mineralogy to tenaciously or permanently stabilize clays from swelling and further movement. This additive in an embodiment can also inhibit or prevent damage in the reservoir rock that might otherwise occur due to mobilization of fines, i.e. formation permeability damage due to fines migration to block pores. The additive can in one embodiment also be added to a prepad or a preflush in any well treatment operation so that the formation is prepared to receive other aqueous fluids that could otherwise damage the permeability.

One particular embodiment of the additive is a polyamine of the formula $H_2$—N—R-(0-R')x-$NH_2$ wherein R and R' are divalent hydrocarbyl such as alkylene of from 1 to 6 carbon atoms, e.g. methylene, ethylene, propylene, butylene, pentylene, hexylene, or the like, and x has a value from 1 to 10, or an acid addition product thereof. Stated another way, the additive in one embodiment is a poly(oxyalkylene) polyamine. In an embodiment, R and R' in the above formula are the same or different branched alkylene of 3 to 5 carbon atoms, e.g. 1,2-propylene, 1,2-butylene, 1,3-butylene, 1,2-pentylene, 1,3-pentylene, 1,4-pentylene, etc. In an embodiment, the additive is a diamine ether according to the following formula:

or an acid addition salt thereof.

Brine and electrolytes. In some aspects, the invention uses treatment fluid comprising a brine carrier having a density of at least about 1.02 kg/L (8.5 ppg (8.5 pounds per gallon)), but may be as low as about 1 kg/L (8.3 ppg). As used herein, a heavy brine, sometimes also called a high density brine or high brine, is an aqueous inorganic salt solution having a specific gravity of greater than about 1.02 kg/L (8.5 lb/gal (ppg)), about 1.08 kg/L (9 ppg) or about 1.14 kg/L (9.5 ppg), especially above about 1.2, about 1.32, about 1.44 or about 1.5 kg/L (10, 11, 12 or 12.5 ppg), or up to about 1.8 kg/L (15 ppg). Available water, other than brine, may also be used in some embodiments as the carrier for the treatment fluid.

When used, the brine is water comprising an inorganic salt or organic salt. Embodiments of inorganic monovalent salts include alkali metal halides, more preferably sodium, potassium or cesium bromide. Embodiments of inorganic divalent salts include calcium halides, for example, calcium chloride or calcium bromide. Zinc halides, especially zinc bromide, may also be used. Inorganic salt can be added to the carrier fluid in any hydration state (i.e. anhydrous, monohydrated, dihydrated, etc.). The carrier brine phase may also comprise an organic salt, in embodiments sodium or potassium formate, acetate or the like, which may be added to the treatment fluid up to a concentration at which phase separation might occur, approximately 1.14 kg/L (9.5 ppg). In an embodiment, mixture of organic and inorganic salts can achieve a density higher than about 1.2 kg/L (10 ppg).

The salt in one embodiment is compatible with the drilling fluid which was used to drill the wellbore, e.g. the salt in the treatment fluid used as a prepad or preflush, or in a completion/clean up fluid, can be the same as the salt used in the drilling fluid. In embodiments where hydroxyethylaminocarboxylic acids are used for wellbore clean up, for example, the treatment brine for delivering the diamine ether can consist essentially of monovalent salts, avoiding divalent salts might form chelates or other complexes and thus make less of the hydroxyethylaminocarboxylic acid available for clean up. In an embodiment, where a zwitterionic surfactant is employed, the electrolyte should also be compatible with the brine, for example, a density up to about 1.2 kg/L (10 ppg) where the brine phase of other completion or reservoir drilling fluids comprises potassium formate, sodium acetate or the like at up to about 24 wt % (1.14 kg/L (9.5 ppg)). In an embodiment, the electrolyte in the treatment fluid may be used in an amount of from about 0.01 wt % to about 30.0 wt % of the total liquid phase weight.

Organoamines. Fluids used in some embodiments of the invention may also comprise an organoamine compound. Examples of suitable organoamine compounds include, but are not necessarily limited to, tetraethylenepentamine, triethylenetetramine, pentaethylenehexamine, triethanolamine, and the like, or any mixtures thereof. When organoamine compounds are used in fluids of the invention, they may be incorporated in an amount from about 0.01 wt % to about 2.0 wt % based on total liquid phase weight, more particularly, the organoamine compound may be incorporated at an amount from about 0.05 wt % to about 1.0 wt % based on total liquid phase weight. A particularly useful organoamine compound is tetraethylenepentamine, particularly when used with diutan viscosifying agent at temperatures of approximately 150° C. (300° F.).

Surfactants. A viscoelastic surfactant fluid system (VES) in an embodiment can include cationic, amphoteric, anionic, nonionic, mixed, and zwitterionic viscoelastic surfactant fluid systems. Non-limiting examples include those described in U.S. Pat. Nos. 5,551,516; 5,964,295; 5,979,555; 5,979,557; 6,140,277; 6,258,859 and 6,509,301, all hereby incorporated by reference. In general, suitable zwitterionic surfactants have the formula:

$$RCONH—(CH_2)_a(CH_2CH_2O)_m(CH_2)_b—N^+(CH_3)_2—(CH_2)_{a'}(CH_2CH_2O)_{m'}(CH_2)_{b'}COO^-$$

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and —CH$_2$CH$_2$O— may also be oriented as —OCH$_2$CH$_2$—. In an embodiment, the surfactants are betaines.

Two examples of commercially available betaine concentrates are, respectively, BET-O-30 and BET-E-40. The VES surfactant in BET-O-30 is oleylamidopropyl betaine. It is designated BET-O-30 because as obtained from the supplier (Rhodia, Inc. Cranbury, N.J., U.S.A.) it is called Mirataine BET-O-30; it contains an oleyl acid amide group (including a C$_{17}$H$_{33}$ alkene tail group) and is supplied as about 30% active surfactant; the remainder is substantially water, sodium chloride, glycerol and propane-1,2-diol. An analogous suitable material, BET-E-40, contains erucylamidopropyl betaine. BET surfactants, and others that are suitable, are described in U.S. Pat. No. 6,258,859. Certain co-surfactants may be useful in extending the brine tolerance, to increase the gel strength, and to reduce the shear sensitivity of VES fluids, in particular for BET-O-type surfactants. An example given in U.S. Pat. No. 6,258,859 and U.S. Pat. No. 6,762,154, which are hereby incorporated herein by reference, is sodium dodecylbenzene sulfonate (SDBS). VES's may be used with or without this type of co-surfactant, for example those having a SDBS-like structure having a saturated or unsaturated, branched or straight-chained C$_6$ to C$_{16}$ chain; further examples of this type of co-surfactant are those having a saturated or unsaturated, branched or straight-chained C$_8$ to C$_{16}$ chain. Other suitable examples of this type of co-surfactant, especially for BET-O-30, are certain chelating agents such as trisodium hydroxyethylethylenediamine triacetate.

Exemplary cationic viscoelastic surfactants include the amine salts and quaternary amine salts disclosed in commonly assigned U.S. Pat. Nos. 5,979,557, and 6,435,277 which are hereby incorporated by reference.

Examples of suitable cationic viscoelastic surfactants include cationic surfactants having the structure:

$$R_1N^+(R_2)(R_3)(R_4)X^-$$

in which R$_1$ has from about 14 to about 26 carbon atoms and may be branched or straight chained, aromatic, saturated or unsaturated, and may contain a carbonyl, an amide, a retroamide, an imide, a urea, or an amine; R$_2$, R$_3$, and R$_4$ are each independently hydrogen or a C$_1$ to about C$_6$ aliphatic group which may be the same or different, branched or straight chained, saturated or unsaturated and one or more than one of which may be substituted with a group that renders the R$_2$, R$_3$, and R$_4$ group more hydrophilic; the R$_2$, R$_3$ and R$_4$ groups may be incorporated into a heterocyclic 5- or 6-member ring structure which includes the nitrogen atom; the R$_2$, R$_3$ and R$_4$ groups may be the same or different; R$_1$, R$_2$, R$_3$ and/or R$_4$ may contain one or more ethylene oxide and/or propylene oxide units; and X$^-$ is an anion. Mixtures of such compounds are also suitable. As a further example, R$_1$ is from about 18 to about 22 carbon atoms and may contain a carbonyl, an amide, or an amine, and R$_2$, R$_3$, and R$_4$ are the same as one another and contain from 1 to about 3 carbon atoms.

Cationic surfactants having the structure R$_1$N$^+$(R$_2$)(R$_3$)(R$_4$)X may optionally contain amines having the structure R$_1$N(R$_2$)(R$_3$). It is well known that commercially available cationic quaternary amine surfactants often contain the corresponding amines, in which R$_1$, R$_2$, and R$_3$ in the cationic surfactant and in the amine have the same structure. As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, copolymers, and mixtures of these members. They may also contain performance enhancers, such as viscosity enhancers, for example polysulfonates, polysulfonic acids or the like, as described in U.S. Pat. No. 7,084,095 which is hereby incorporated by reference.

Another embodiment of a cationic VES is erucyl bis(2-hydroxyethyl)methyl ammonium chloride, also known as (Z)-13 docosenyl-N—N-bis(2-hydroxyethyl)methyl ammonium chloride. It is commonly obtained from manufacturers as a mixture containing about 60 weight percent surfactant in a mixture of isopropanol, ethylene glycol, and water. Other embodiments of amine salts and quaternary amine salts include (either alone or in combination in accordance with the invention), erucyl trimethyl ammonium chloride; N-methyl-N,N-bis(2-hydroxyethyl)rapeseed ammonium chloride; oleyl methyl bis(hydroxyethyl)ammonium chloride; erucylamidopropyltrimethylamine chloride, octadecyl methyl bis (hydroxyethyl)ammonium bromide; octadecyl tris(hydroxyethyl)ammonium bromide; octadecyl dimethyl hydroxyethyl ammonium bromide; cetyl dimethyl hydroxyethyl ammonium bromide; cetyl methyl bis(hydroxyethyl)ammonium salicylate; cetyl methyl bis(hydroxyethyl)ammonium 3,4,-dichlorobenzoate; cetyl tris(hydroxyethyl)ammonium iodide; cosyl dimethyl hydroxyethyl ammonium bromide; cosyl methyl bis(hydroxyethyl)ammonium chloride; cosyl tris(hydroxyethyl)ammonium bromide; dicosyl dimethyl hydroxyethyl ammonium bromide; dicosyl methyl bis(hydroxyethyl)ammonium chloride; dicosyl tris(hydroxyethyl) ammonium bromide; hexadecyl ethyl bis(hydroxyethyl)ammonium chloride; hexadecyl isopropyl bis(hydroxyethyl) ammonium iodide; and cetylamino, N-octadecyl pyridinium chloride; and the like.

Amphoteric viscoelastic surfactants comprise another embodiment. Exemplary amphoteric viscoelastic surfactant systems include those described in U.S. Pat. No. 6,703,352, for example amine oxides. Other exemplary viscoelastic surfactant systems include those described in U.S. Pat. Nos. 7,060,661, 7,303,018, and 2005-0137095, for example amidoamine oxides. These four references are hereby incorporated in their entirety. Mixtures of zwitterionic surfactants and amphoteric surfactants comprise an embodiment. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

Polymers. In an additional embodiment or as an alternative embodiment to surfactants, the diamine ethers can also be used with polymers that are commonly used to thicken or otherwise modify the rheology of treatment fluids such as gravel packing and fracturing fluids. For example, in one embodiment, the treatment fluid can include polymers that are either crosslinked or linear, or any combination thereof. Polymers include natural polymers, derivatives of natural polymers, synthetic polymers, biopolymers, and the like, or any mixtures thereof. An embodiment uses any viscosifying polymer used in the oil industry to form gels. Another embodiment uses any friction-reducing polymer used in the oil industry to reduce friction pressure losses at high pumping rates, e.g. in slickwater systems. Some non-limiting examples of suitable polymers include: polysaccharides, such as, for example, guar gums, high-molecular weight polysaccharides composed of mannose and galactose sugars, including guar derivatives such as hydropropyl guar (HPG), carboxymethyl guar (CMG), and carboxymethylhydroxypropyl guar (CM-HPG), and other polysaccharides such as xanthan, diutan, and scleroglucan; cellulose derivatives such as hydroxyethyl cellulose (HEC), hydroxypropyl cellulose (HPC), carboxymethylhydroxyethyl cellulose (CMHEC), and the like; synthetic polymers such as, but not limited to, acrylic and methacrylic acid, ester and amide polymers and copolymers, polyalkylene oxides such as polymers and copolymers of ethylene glycol, propylene glycol or oxide, and the like. The polymers are preferably water soluble. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups, as described published application US 2004209780.

As used herein, when a polymer is referred to as comprising a monomer or comonomer, the monomer is present in the polymer in the polymerized form of the monomer or in the derivative form of the monomer. However, for ease of reference the phrase comprising the (respective) monomer or the like may be used as shorthand.

In some cases, the polymer or polymers are formed of a linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$-$C_4$, $C_2$/$C_3$, $C_3$/$C_4$, or $C_2$/$C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{24}$-alkyl-substituted hydroxyalkyl galactomannans, e.g., wherein the amount of alkyl substituent groups is preferably about 2 percent by weight or less by weight of the hydroxyalkyl galactomannan; and 2) poly(oxyalkylene)-grafted galactomannans (see, e.g., A. Bahamdan & W. H. Daly, in Proc. 8PthP Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly (oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly (oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans in one embodiment comprise a polymannose backbone attached to galactose branches that are present at an average ratio of from 1:1 to 1:5 galactose branches:mannose residues. Preferred galactomannans comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments of the present invention may be described or exemplified with reference to guar, such as by reference to hydroxy-$C_1$-$C_4$-alkyl guars, such descriptions apply equally to other galactomannans, as well.

Friction reducers may also be incorporated into fluids used in the invention. Any friction reducer may be used, e.g. hydoxyethyl cellulose (HEC), xanthan, 2-acrylamido-2-methylpropanesulfonic acid (AMPS), diutan and the like. Also, polymers such as polyacrylamide, polyisobutyl methacrylate, polymethyl methacrylate and polyisobutylene as well as water-soluble friction reducers such as guar gum, guar gum derivatives, hydrolyzed polyacrylamide, and polyethylene oxide may be used. Commercial drag reducing chemicals such as those sold by Conoco Inc. under the trademark CDR as described in U.S. Pat. No. 3,692,676 (Culter et al.) or drag reducers such as those sold by Chemlink designated under the trademarks FLO 1003, 1004, 1005 & 1008 have also been found to be effective. These polymeric species added as friction reducers or viscosity index improvers may also act as fluid loss additives reducing or even eliminating the need for conventional fluid loss additives.

When incorporated in the well treatment or other fluid, the polymers may be present at any suitable concentration. In various embodiments hereof, the polymer can be present in an amount of from about 0.01 g/L of fluid (0.1 lb/1000 gal of fluid (ppt)) to less than about 7.2 g/L (60 ppt), or from about 0.018 to about 4.8 g/L (about 1.5 to about 40 ppt), from about 0.018 to about 4.2 g/L (about 1.5 to about 35 ppt), or from 0.018 to about 3 g/L (1.5 to about 25 ppt), or even from about 0.24 to about 1.2 g/L (about 2 to about 10 ppt). Friction reducing polymers are generally used in the treatment fluid at a concentration from 0.01 to 0.4 percent by weight of the liquid phase, especially from 0.025 to 0.2 percent by weight of the liquid phase. In other embodiments, the polymer is present in the treatment fluid at a rate within a range of from any lower limit selected from 0.0001, 0.001, 0.01, 0.025, 0.05, 0.1, or 0.2 percent by weight of the liquid phase, up to any higher upper limit selected from 1.0, 0.5, 0.4, 0.25, 0.2, 0.15 or 0.1 percent by weight of the liquid phase.

In one embodiment, the polymer comprises a heteropolysaccharide. While any suitable heteropolysaccharide may be used, microbial polysaccharides commonly known as sphingans are particularly useful. Sphingans generally are acidic capsular heteropolysaccharides secreted by *Sphingomonas* bacteria as described by Pollock, T. J., Sphingan Group of Exopolysaccharides (EPS), in Biopolymers, Vol. 5, E. J. Vandamme, S. DeBaets, and A. Steinbüchel, Editors. 2002, Wiley-VCH Verlag GmbH, p. 239-258. In some embodiments of the invention, the heteropolysaccharide is an sphingan or a derivatized sphingan having a tetrasaccharide repeating unit in the polymer backbone as represented by the chemical formula:

or represented by the alternative formula scheme:

wherein at least three different saccharides are present in the repeating unit, such saccharides including D-glucose (D-Glc), D-glucuronic acid (D-GlcA), and either L-rhamnose (X=Rha; $R^{11}$=CH$_3$) or L-mannose (X=Man; $R^{11}$=CH$_2$OH); the weight average molecular weight (Mw) for the heteropolysaccharide is from about $10^5$ to about $10^7$; $M^+$ is any ionic species effective to associate via electrostatic interactions with the carboxylic group present in the D-glucuronic acid unit, wherein $M^+$ includes, for example, but not necessarily limited to: $H^+$, $Na^+$, $K^+$, $NH_4^+$, ½$Ca^{+2}$ and ½$Mg^+$₂; substituents for the number 2 positions of all saccharide units ($R^3$, $R^5$, $R^8$, and $R^{10}$), substituents for the number 3 positions of the position number 4-linked saccharide units ($R^4$, $R^7$, and $R^9$), substituent for the number 4 position of the position 3-linked glucose unit ($R^2$), and substituents for the number 6 positions of the D-glucose units ($R^1$ and $R^6$) may be by non-limiting example a hydrogen (—H), methyl (—CH$_3$), acetyl (—COCH$_3$), glyceryl (—COCH$_2$(OH)CH$_2$OH) or a saccharide group containing one to three saccharide units, wherein the saccharide units present in the saccharide side-group include, but are not limited to: D-glucose, D-glucuronic acid, D-galacturonic acid, L-rhamnose, L-mannose, D-mannose, 2,3:5,6-gi-O-isopropylidene-D-mannofuranose, 2,3-O-isopropylidene-D-ribono-1,4-lactone, 3,4-O-isopropylidene-D-mannitol, D-arabinose, L-arabinose, D-erythrose, L-erythrose, D-fucose, L-fucose, lactulose, D-lyxose, maltulose, L-mannitol, D-mannono-1,4-lactone, L-mannono-1,4-lactone, methyl-α-D-fucopyranoside, D-ribonic acid, D-ribono-1,4-lactone, L-ribose, D-sorbose, D-tagatose, D-talitol, D-talose, L-xylose, and the like, and any derivatives. Also, the substituents $R^1$ thru $R^{11}$ above may differ from repeating unit to repeating unit within the heteropolysaccharide's backbone chemical structure. For example, $R^1$ could be hydrogen (—H) in one repeating unit and an acetyl group (—COCH$_3$) in the following repeating unit.

Suitable sphingans or derivatized sphingans include, but are not necessarily limited to, the following heteropolysaccharides and derivatives thereof:

gellan gum as described in Kuo, M. S., A. J. Mort, and A. Dell, Identification and location of L-glycerate, an unusual acyl substituent in gellan gum, Carbohydrate Research, 1986, 156: p. 173-187, wherein $R^1$, $R^2$, $R^3$, $R^4$, $R^5$, $R^6$, $R^7$, $R^8$, $R^9$, and $R^{10}$ are hydrogen (—H) groups, and $R^{11}$ is a methyl (—CH$_3$) group (or X=Rha);

welan gum as described by Stankowski, J. D. and S. G. Zeller, Location of the O-acetyl group in welan by the reductive-cleavage method, Carbohydrate Research, 1992, 224: p. 337-341, wherein $R^1$, $R^2$, $R^3$, $R^4$, $R^5$, $R^6$, $R^8$, $R^9$, and $R^{10}$ are hydrogen (—H) groups, $R^{11}$ is a methyl (—CH$_3$) group (or X=Rha), and $R^7$ is an α-L-rhamnose or α-L-mannose group (α-L-Rha (1→, or α-L-Man (1→);

diutan gum as described by Chowdhury, T. A., et al., Structural studies of an extracellular polysaccharide, S-657, elaborated by Xanthomonas ATCC 53159, Carbohydrate Research, 1987, 164: p. 117-122, wherein $R^1$, $R^2$, $R^3$, $R^4$, $R^5$, $R^6$, $R^8$, $R^9$, and $R^{10}$ are hydrogen (—H) groups, $R^{11}$ is a methyl (—CH$_3$) group (or X=Rha), and $R^7$ is two α-L-rhamnose groups linked at the 1,4 ring positions (α-L-Rha (1→4) α-L-Rha (1→);

heteropolysaccharide S-8 available from CP Kelco of 123 North Wacker Dr, Suite 2000 Chicago, Ill. 60606 USA, described by the manufacturer as an even purer diutan gum with respect to the S-657 strand. Purity is defined by the manufacturer for this product as % Diutan=% CO$_2$*(Mass of diutan repeating unit)/(mass of CO$_2$). The repeat unit mass was 992.93, assuming no acetate and the $K^+$ form. Hence, for S-8 strain, 4.0% CO$_2$ content was reported and purity=4*992.93/44=90.3%, as compared with S-657, 3.2% CO$_2$ giving purity=3.2*992.93/44=72.2%.

diutan gum as described by described by Chowdhury, T. A., et al., Structural studies of an extracellular polysaccharide, S-657, elaborated by Xanthomonas ATCC 53159, Carbohydrate Research, 1987, 164: p. 117-122, wherein $R^1$, $R^2$, $R^3$, $R^4$, $R^5$, $R^6$, $R^8$, $R^9$, and $R^{10}$ are hydrogen (—H) groups, $R^{11}$ is a methyl (—$CH_3$) group (or X=Rha), and $R^7$ is two α-L-rhamnose groups linked at the 1,4 ring positions (α-L-Rha (1→4) α-L-Rha (1→));

rhamsan gum as described by Jansson, P. E., et al., Structural studies of a polysaccharide (S-194) elaborated by Alcaligenes ATCC 31961, Carbohydrate Research, 1986, 156: p. 157-163, wherein $R^2$, $R^3$, $R^4$, $R^5$, $R^6$, $R^7$, $R^8$, $R^9$, and $R^{10}$ are hydrogen (—H) groups, $R^{11}$ is a methyl (—$CH_3$) group (or X=Rha), and $R^1$ is two β-D-glucose groups linked at the 1,6 ring positions (β-D-Glc (1→6) β-D-Glc (1→));

heteropolysaccharide S-88 as described by Jannson, P. E., N. S. Kumar, and B. Lindberg, Structural studies of a polysaccharide (S-88) elaborated by Pseudomonas ATCC 31554, Carbohydrate Research, 1986, 156: p. 165-172, wherein $R^1$, $R^2$, $R^3$, $R^4$, $R^5$, $R^6$, $R^8$, $R^9$, and $R^{10}$ are hydrogen (—H) groups, $R^{11}$ is a methyl (—$CH_3$) group (X=Rha) or methylol (—$CH_2OH$) group (X=Man), and $R^7$ is an α-L-rhamnose group (α-L-Rha (1→));

heteropolysaccharide S-198 as described by Chowdhury, T. A., B. Lindberg, and U. Lindquist, Structural studies of an extracellular polysaccharide (S-198) elaborated by Alcaligenes ATCC 31853, Carbohydrate Research, 1987, 161: p. 127-132, wherein $R^1$, $R^3$, $R^4$, $R^5$, $R^6$, $R^7$, $R^8$, $R^9$, and $R^{10}$ are hydrogen (—H) groups, $R^{11}$ is a methyl (—$CH_3$) group (X=Rha) or methylol (—$CH_2OH$) group (X=Man), and $R^2$ is an α-L-rhamnose group (α-L-Rha (1→)); and, heteropolysaccharide NW11 as described in Pollock, T. J., Sphingan Group of Exopolysaccharides (EPS), in Biopolymers, Vol. 5, E. J. Vandamme, S. DeBaets, and A. Steinbüchel, Editors, 2002, Wiley-VCH Verlag GmbH, p. 239-258, wherein $R^1$, $R^2$, $R^3$, $R^4$, $R^5$, $R^6$, $R^7$, $R^8$, $R^9$, and $R^{10}$ are hydrogen (—H) groups, and $R^{11}$ is a methylol (—$CH_2OH$) group (X=Man).

In one embodiment, the heteropolysaccharide used in fluids of the invention is a diutan gum having a tetrasaccharide repeating unit in the polymer backbone as represented by the chemical formula:

or represented by the alternative formula scheme.

wherein $M^+$ is any ionic species effective to associate via electrostatic interactions with the carboxylic group, wherein $M^+$ includes, for example, but not necessarily limited to, $H^+$, $Na^+$, $K^+$, $NH4^+$, $½Ca^{+2}$ and $½Mg^{+2}$; and the weight average molecular weight (Mw) for the diutan gum is from about $10^5$ to about $10^7$. Diutan heteropolysaccharides are available, for example, from CP Kelco of 123 North Wacker Dr, Suite 2000 Chicago, Ill. 60606 USA, and may also be used in either crosslinked form, or without crosslinker. Diutan is generally composed of carbohydrate, about 12% protein and about 7% (calculated as O-acetyl) acyl groups, where the carbohydrate portion containing about 19% glucuronic acid, and the neutral sugars rhamnose and glucose are present in the approximate ratio of 2:1. Details of preparing diutan are given in U.S. Pat. No. 5,175,278 (Peik et al.), hereby incorporated by reference. O-acetyl groups may also be present on the number 2 position and the 2,6-positions of the 3-linked D-Glucose unit as described in Diltz, S. and S. G. Zeller, Location of O-acetyl groups in S-657 using the reductive-cleavage method. Carbohydrate Research, 2001. 331: p. 265-270.

Heteropolysaccharides are incorporated into the fluid embodiments of the invention in amounts ranging from about 0.01% to about 1.0% by weight of total weight of liquid phase, and preferably from about 0.10% to about 0.40% by weight of total weight of liquid phase.

Crosslinkers. While linear polymer systems can be used in an embodiment, they generally require higher polymer levels for the same Theological modification. In some embodiments, the fluids used may further include a crosslinker. Adding crosslinkers to the fluid may further augment the viscosity of the fluid. Crosslinking consists of the attachment of two polymeric chains through the chemical association of such chains to a common element or chemical group. Suitable crosslinkers may comprise a chemical compound containing a polyvalent ion such as, but not necessarily limited to, boron or a metal such as chromium, iron, aluminum, titanium, antimony and zirconium, or mixtures of polyvalent ions. Suitable boron crosslinked polymers systems include by non-limiting example, guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium crosslinked polymer systems include by non-limiting example, those crosslinked by zirconium lactates (for example sodium zirconium lactate), triethanolamines, 2,2'-iminodiethanol, and with mixtures of these ligands, including when adjusted with bicarbonate. Suitable titanates include by non-limiting example, lactates and triethanolamines, and mixtures, for example delayed with hydroxyacetic acid.

Gas components. Some fluid compositions useful in some embodiments of the invention may also include a gas component, produced from any suitable gas that forms an energized fluid or foam when introduced into an aqueous medium. See, for example, U.S. Pat. No. 3,937,283 (Blauer et al.)

incorporated herein by reference. Preferably, the gas component comprises a gas selected from the group consisting of nitrogen, air, argon, carbon dioxide, and any mixtures thereof. More preferably the gas component comprises nitrogen or carbon dioxide, in any quality readily available. The gas component may assist in the fracturing and acidizing operation, as well as the well clean-up process.

The fluid in one embodiment may contain from about 10% to about 90% or more volume gas component based upon total fluid volume percent, preferably from about 20% to about 80% volume gas component based upon total fluid volume percent, and more preferably from about 30% to about 70% volume gas component based upon total fluid volume percent.

Breakers. Breakers, in addition to those described above, may optionally be used in some methods of the invention. The purpose of this component is to break or diminish the viscosity of the fluid so that this fluid is even more easily recovered from the formation during cleanup. With regard to breaking down viscosity, oxidizers, enzymes, or acids may be used.

Proppants. Embodiments of the invention may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 US Standard Mesh (approx. 0.84 mm to 0.15 mm) in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981.

The concentration of proppant in the fluid can be any concentration known in the art, and, as an example, may be in the range of from about 0.05 to about 3 kilograms of proppant added per liter of liquid phase. Also, any of the proppant particles can further be coated with a resin to potentially improve the strength, clustering ability, and flow back properties of the proppant.

Fibers. A fiber component may be included in the fluids used in the invention to achieve a variety of properties including improving particle suspension, and particle transport capabilities, and gas phase stability. Fibers used may be hydrophilic or hydrophobic in nature, but hydrophilic fibers are particularly useful. Fibers can be any fibrous material, such as, but not necessarily limited to, natural organic fibers, comminuted plant materials, synthetic polymer fibers (non-limiting examples including polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be included at concentrations from about 1 to about 15 grams per liter of the liquid phase of the fluid, more particularly, the concentration of fibers may be from about 2 to about 12 grams per liter of liquid, and more particularly, from about 2 to about 10 grams per liter of liquid.

Other fluid additives. Embodiments of the invention may use other additives and chemicals that are known to be commonly used in oilfield applications by those skilled in the art. These include, but are not necessarily limited to, materials in addition to those mentioned hereinabove, such as breaker aids, oxygen scavengers, alcohols, scale inhibitors, corrosion inhibitors, fluid-loss additives, bactericides, iron control agents, organic solvents, and the like, depending on the intended use of the fluid, formation conditions and other parameters readily apparent to one of ordinary skill in the art. For example, drilling fluids may further comprise surface active agents, other viscosifiers such as polymers, filtration control agents such as Gilsonite and modified starches, density increasing agents such as powdered barites or hematite or calcium carbonate, or other wellbore fluid additives known to those skilled in the art.

Treatment procedure. In one embodiment, the present invention relates to formation treatment for fines inhibition. In an embodiment, the treatment fluid comprising the shale inhibitor, and optionally also comprising a brine such as KCl or TMAC or another clay stabilizer, is pumped into the treatment zone of interest. In an embodiment, the treatment fluid is pumped sufficiently above the reservoir fluid pressure to enter the treatment zone. In embodiments, the treatment fluid can be above or below a fracture initiation pressure. In embodiments, the wellbore is cased or open hole adjacent the treatment zone. In embodiments, the treatment zone contacted with the shale inhibitor extends radially from the wellbore for a minimum distance equal to at least about 1, 2, 3, 5, 10, 50 or even about 100 wellbore diameters.

In an embodiment, the treatment zone is soaked in the treatment fluid for a period of time effective to inhibit fines migration, such as for example, a few minutes to several days or more. In embodiments, the treatment fluid-treatment zone contact time is at least from a lower limit of 5, 10, or 30 minutes, or at least from 1, 2, 4, 8, 12, 24, 48 or 72 hours, and in other embodiments is within a range from any lower limit up to a higher upper limit of 1 week, 3 days, 2 days or 24, 12, 8, 4, 2 or 1 hour. In an embodiment, during the life of the well, the treated zone can be unsusceptible to water damage, especially near the wellbore, or in one embodiment at least less susceptible to water damage relative to the same zone in the absence of the treatment. In a production well, the reservoir fluids passing through the treatment zone may contain water; in an injection well, the injected fluids may contain water.

Regardless of the intended use, the treatment fluid can be prepared at any time prior to use by combining the clay inhibitor, the polymer and crosslinker, or the viscoelastic surfactant, the co-surfactant and or the chelating agent, and the high density brine carrier fluid, as well as any further components. The polymer, when used, can be hydrated by mixing with water at the wellsite or provided in a prehydrated form, as is known in the art. The viscoelastic surfactant, when used, can be provided in an aqueous solution, but also can be provided in any other form. The high density brine carrier fluid can be prepared by the addition of the inorganic salt to the carrier fluid any time before, during, or after addition of the viscoelastic surfactant to the fluid. Additives to be included in the fluid can be added to the fluid at any time prior to use or even added to the fluid after it has been injected into the wellbore.

Stand alone treatment. In one embodiment, the present invention relates to stand alone formation treatment for fines inhibition, for example, in advance of production and/or injection. As used herein, stand alone treatment refers to a formation treatment by itself rather than as a preflush or post flush in conjunction with another well treatment procedure. In the stand alone treatment embodiment, the treatment fluid comprising the shale inhibitor, and optionally also comprising a brine such as KCl or TMAC or another clay stabilizer, is pumped into the treatment zone of interest before initiating reservoir fluid production and/or water or steam injection via the wellbore. In an embodiment, the treatment fluid is pumped below the fracture initiation pressure but sufficiently above the reservoir fluid pressure to enter the treatment zone. After a sufficient soak to inhibit fines migration and water damage, the wellbore is used for production or injection as desired, but without fear of early water damage to the treated formation adjacent the wellbore.

Stimulation treatment. In one embodiment, the present invention relates to formation treatment for fines inhibition either before as a preflush or during as a part of a stimulation treatment procedure, for example, fracturing, acidizing or the like. As a preflush embodiment, the treatment fluid comprising the shale inhibitor, and optionally also comprising a brine such as KCl or TMAC or another clay stabilizer, is injected as described above in advance of the stimulation procedure, e.g. in a pad or pre-pad fluid injection stage, with sufficient contact time in the treatment zone to inhibit fines migration during the subsequent stimulation treatment stages and production or injection.

In an embodiment wherein the fines inhibition treatment is integral with or a part of the stimulation procedure, one or a plurality or all of the stimulation procedure stages comprise appropriate formulations of the treatment fluid comprising the shale inhibitor, and optionally also comprising a brine such as KCl or TMAC or another clay stabilizer. In the embodiment wherein the stimulation procedure comprises fracturing and a proppant pack is placed in the fracture, the well can be produced with a reduced risk of proppant pack damage due to fines invasion from the formation.

In one embodiment, especially where the polyamine shale inhibitor is added to all or at least several of the stimulation procedure stages although this is not a specific requirement, the well can be shut in for a period of time following or as a part of the stimulation procedure, e.g. a few hours to a few days, which shut in period is sufficient for the treatment zone to absorb the polyamine inhibitor and acquire resistance to damage due to fines.

In one embodiment, one, or more than one, or all injection stages without polyamine shale inhibitor in the stimulation procedure, subsequent to the shale inhibitor treatment fluid stage, or between shale inhibitor treatment fluid stages separated by one or more intermediate, can optionally also comprise a brine such as KCl or TMAC or another clay stabilizer. For example, each of the polyamine inhibitor and other stimulation procedure fluid stages can contain similar KCl, TMAC or other electrolyte levels to help avoid inducing salinity change stresses in the water sensitive minerals in the treatment zone.

In an alternative or additional embodiment, the subsequent and/or intermediate stimulation procedure stages, relative to the polyamine inhibitor stage(s), can have different electrolyte levels. For example, each of the polyamine inhibitor stage(s) can contain KCl, TMAC or other electrolyte levels to help avoid formation water damage during treatment with the polyamine inhibitor, but then the subsequent and/or intermediate stimulation procedure fluid stages can be free of the KCl, TMAC or other electrolytes, or have reduced levels thereof, because the preceding polyamine inhibitor treatment stage has effected more or less permanent water insensitivity and thus there can be no need for the electrolytes, at least for the purposes of avoiding salinity-change-related damage to the treated formation.

Conventional propped hydraulic fracturing and frac-pack techniques, with appropriate adjustments if necessary, as will be apparent to those skilled in the art, are used in the methods of the invention. In an example of a fracture stimulation treatment, the treatment may begin with a conventional pad stage to generate the fracture, followed by a sequence of stages in which a viscous carrier fluid transports proppant into the fracture as the fracture is propagated. The clay inhibitor in embodiments is present in the pad stage or a prepad stage, or can be included in the proppant stage, and can be followed by a soak or period of time in which the inhibitor is present in contact with the formation to treat the water-sensitive minerals therein so that they are more inert and less likely to swell and/or result in migration of fines within the treatment zone. Typically, in this sequence of stages the amount of propping agent is increased, normally stepwise. The pad and carrier fluid can be, and usually are, a gelled aqueous fluid. The pad and carrier fluids may contain various additives. Non-limiting examples are fluid loss additives, crosslinking agents, clay control agents, breakers, iron control agents, and the like, provided that the additives do not affect the stability or action of the fluid.

The procedural techniques for pumping fluids down a wellbore to treat a subterranean formation are well known. The person that designs such fracturing treatments is the person of ordinary skill to whom this disclosure is directed. That person has available many useful tools to help design and implement treatments, one of which is a computer program commonly referred to as a fracture simulation model (also known as fracture models, fracture simulators, and fracture placement models). One commercial fracture simulation model that is widely used by several service companies is known as Frac-CADE™. This commercial computer program is a fracture design, prediction, and treatment-monitoring program designed by Schlumberger, Ltd. All of the various fracture simulation models use information available to the treatment designer concerning the formation to be treated and the various treatment fluids (and additives) in the calculations, and the program output is a pumping schedule that is used to pump the fracture stimulation fluids into the wellbore. The text "Reservoir Stimulation," Third Edition, Edited by Michael J. Economides and Kenneth G. Nolte, Published by John Wiley & Sons, (2000), is an excellent reference book for fracturing and other well treatments; it discusses fracture simulation models in Chapter 5 (page 5-28) and the Appendix for Chapter 5 (page A-15)).

Gravel packing. In one embodiment, the present invention relates to a method of gravel packing a wellbore. For gravel packing, the fluid in an embodiment comprises, in addition to the diamine ether when used in the primary gravel packing fluid, gravel and other optional additives such as filter cake clean up reagents such as chelating agents referred to above or acids (e.g. hydrochloric, hydrofluoric, formic, acetic, citric acid), corrosion inhibitors, scale inhibitors, biocides, leak-off control agents, among others. For this application, suitable gravel or sand in an embodiment can have a mesh size between 8 and 70 US Standard Sieve Series mesh. The clay inhibitor in various embodiments can be added to the gravel packing fluid containing the gravel, or it can be used in a prepad or flush, optionally with a soak, in advance of the gravel stage.

Gravel packing is used in an embodiment on unconsolidated formations, which tend to produce an undesirably high level of particulates together with the formation fluids. The method involves the placement of a solution comprising a quantity of gravel and/or sand having a suitable mesh size into the formation adjacent to the wellbore. It is sometimes desirable to bind the gravel particles together to form a porous matrix for passage of formation fluids while facilitating the filtering out and retention in the well of the bulk of the unconsolidated sand and/or fines transported to the near wellbore area by the formation fluids. The gravel particles can constitute a resin-coated gravel, which is either pre-cured or can be cured by an overflush of a chemical binding agent once the gravel is in place. In some instances, various binding agents have been applied to the gravel particles to bind them together, forming a porous matrix. The gravel or sand is placed in the formation adjacent to the wellbore by injecting a fluid according to the present invention and the gravel or sand into the wellbore. Optionally, fluids of the invention are then removed from the emplaced gravel or sand.

In one embodiment in a cased hole gravel pack, the casing is perforated in the zone of interest, and these perforations allow for some leak off which provides a mechanism to promote packing of the perforations with the gravel. In this embodiment, the carrier fluid stage that leaks off into the formation includes the polyamine shale inhibitor, and can optionally also include a brine such as KCl or TMAC or another clay stabilizer, and thus the formation contacted with the treatment fluid is guarded against damage due to fines migration from the formation into the gravel pack. During subsequent production of the well, better recovery of hydrocarbons and other reservoir fluids is achieved, since formation damage near the perforations that could otherwise impair production, is inhibited or avoided.

In an embodiment of an open hole gravel pack where there can be a risk of filter cake damage that leads to leakoff of the gravel pack carrier fluid and possible loss of productivity due to near-wellbore damage, the polyamine shale inhibitor can be added to the gravel pack carrier fluid as a preventative measure. The gravel pack fluid in various embodiments can be gelled or slick, and can optionally also comprise a brine such as KCl or TMAC or another clay stabilizer. In this embodiment, if the fluid leaks off, the risk of damage due to fines migration is reduced both in the short term and over the life of the well. Another benefit in this embodiment is that the polyamine inhibitor in the treatment fluid can facilitate stabilization of the borehole, especially in shale and other water-sensitive formations.

In one embodiment, the polyamine shale inhibitor can be used in a post gravel pack clean up flush, where the gravel pack is otherwise conventional or in accordance with the gravel packing embodiments of the invention just described. In this embodiment, a cleanup flush stage is pumped into the well, the flush stage comprising the polyamine inhibitor and additives to dissolve the filter cake, and optionally also comprising a brine such as KCl or TMAC or another clay stabi-lizer. As the flush stage takes effect, the apparent permeability of the formation increases and a portion of the flush stage fluid leaks off into the formation. The presence of the inhibitor in the leakoff fluid allows the formation which is contacted thereby to absorb the inhibitor and reduce the risk of formation damage due to fines migration into the gravel pack, for example, relative to a fluid without any inhibitor, or with only a temporary inhibitor, which might cause a water sensitive formation to have impaired productivity. Another benefit in this embodiment is that the polyamine inhibitor in the treatment fluid can facilitate stabilization of the borehole, especially in shale and other water-sensitive formations.

EXAMPLES

Example 1

Gravel Packing

To demonstrate the effectiveness of a partially neutralized diamine ether comprising 2-[2-(2-aminopropoxy)propoxy]propan-1-amine (DAE-1) in a gravel packing fluid, the following test procedure was used. A water sensitive sand pack (i.e. prone to damage due to fines migration and/or clay swelling) was prepared by mixing silica flour, 120 mesh sand and calcium montmorillonite. This mixture was then tested in a Hassler type core holder at room temperature (24° C. (75° F.)) that was confined at 7 MPa (1000 psig). A sequence of fluids was then pumped through the sand pack. A single test was also run at 66° C. (150° F.) where the confining pressure was raised to 10.4 MPa (1500 psig) and a backpressure of 3.55 MPa (500 psig) was used. The general fluids sequence was as follows: (1) Pretreatment evaluation of permeability to 9 wt % KCl at 3 separate flowrates, 1, 3 and 5 mL/min; (2) Injection of at least 6.8 pore volumes of treatment fluid with DAE-1; (3) A period of soaking with treatment fluid; and (4) Water shock using deionized (DI) water.

All diamine ether containing treatment fluids contained 3 vol % DAE-1 in 9% KCl aqueous solution. Tests were run with the following fluids and conditions: Test 1—No treatment fluid (skip steps 2 and 3) (24° C. (75° F.)); Test 2—13.5 pore volumes of DAE-1 solution with a soak time of 40 minutes at 24° C. (75° F.); Test 3—13.5 pore volumes of DAE-1 solution with a soak time of 60 hours at 24° C. (75° F.); Test 4—6.8 pore volumes of DAE-1 solution with a soak time of 15 hours at 66° C. (150° F.).

Figure 1:
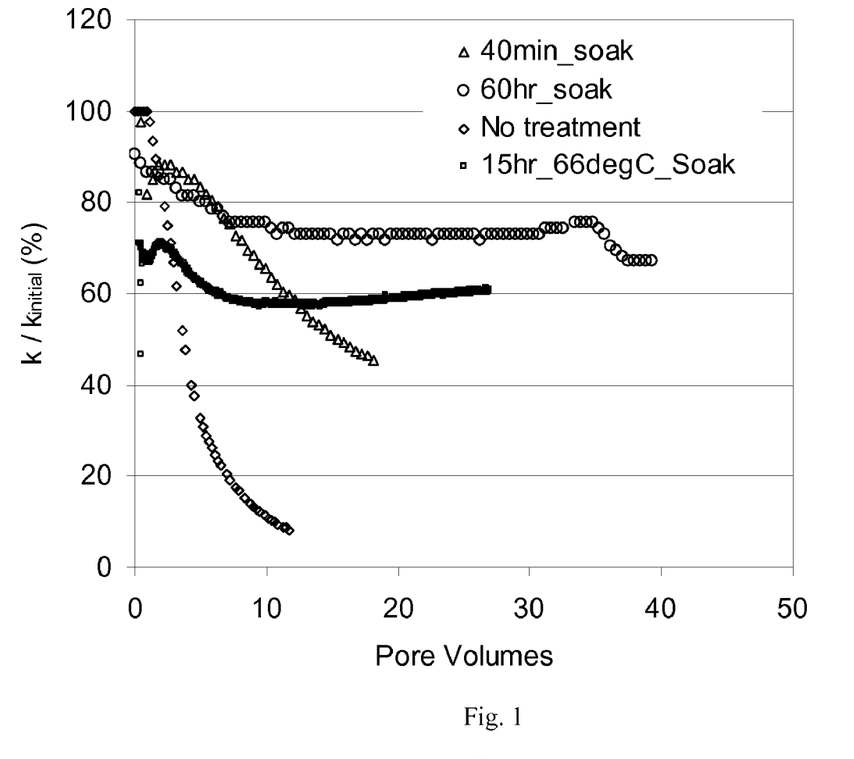
FIG. 1 graphically illustrates the tenacity or permanence of a clay-containing sandpack treated without and with a treatment fluid containing a diamine ether according to embodiments of the present invention.

The data from these tests were collected and plotted in FIG. 1 where the measured permeability (k) was normalized with the initial permeability ($k_i$) for the sand pack, and plotted as a function of pore volumes of fresh water injected.

Without treatment, the core in Test 1 was extremely sensitive to water shock as indicated by the rapid decrease in permeability within 10-12 pore volumes, as seen in FIG. 1 for the data in diamonds. When the core was soaked with the diamine ether solution for about 40 minutes at 24° C. (75° F.), the water sensitivity decreased in Test 2, as seen in FIG. 1 for the data in triangles. Pumping the 13.5 pore volumes in Test 2 also took 60 minutes, thus part of the core had a total exposure time of 100 minutes. When the core treatment in Test 3 was increased to a 60 hour soak at 24° C. (75° F.), plus the 60-minute pumping time for the 13.5 pore volumes, the water sensitivity was further decreased, as shown in FIG. 1 for the data in the circles. In Test 4, a treatment of 6.8 pore volumes was performed at 66° C. (150° F.) with a soak time of 15 hours plus pumping time. Even with the smaller treatment volume and shorter soak time, the core became less sensitive to water as seen in FIG. 1 for the data presented in squares.

In both Test 3 (60 hour soak at 24° C. (75° F.)) and Test 4 (15 hour soak at 66° C. (150° F.)), the treatment appeared to be permanent in that the retained permeability stabilized and did not decrease further over the duration of the test.

Example 2

Completion

Figure 2:
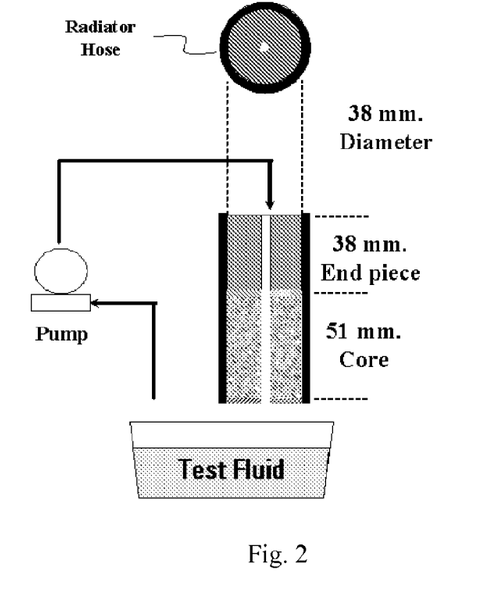
FIG. 2 is a schematic diagram of the core stability apparatus used in Example 2.

To demonstrate a completion embodiment of the invention between drilling and gravel packing, a simple test was devised to simulate the effect of turbulent flow on shale during a gravel pack. A fluid was pumped through a hole drilled in a shale core at a flow rate scaled to actual gravel pack flow conditions. FIG. 2 shows a schematic of the test apparatus. The shale cores used in this test were 38 mm (1.5 in.) in diameter and 51 mm (2 in.) in length. The cores were placed in a 38 mm (1.5 in.) inside diameter hose and held in place with hose clamps. The two open faces of the core were then sealed with beeswax. A 38 mm (1.5 in.) outside diameter metal end piece was also inserted into the hose and held in place with hose clamps. The end piece acted as an interface between the pump lines and the core, allowing the fluid flow to develop and providing a gripping point for the drilling process described below.

A 5 mm (0.195 in.) diameter hole was drilled in air (dry) through the center of the core parallel to the z-axis of the core. After drilling the hole, the core was briefly removed to clear obstructions between the core and the end piece as well as to ensure that the core was still intact. After this inspection, the core was placed back into the hose and resealed with beeswax. The actual test was run immediately after drilling and inspection to minimize drying of the core. A peristaltic pump that was capable of running continuously was used to pump fluids through the core. The shale cores were not mechanically stressed during the test. In the first test, a shale core was treated with 18 wt % KCl that was allowed to soak for 23 hours, after which, the fresh water was flowed through the borehole for 4 hours. Significant erosion in the walls of the borehole was seen, indicating that the KCl treatment by itself was not successful in preventing shale reactivity with water.

In a similar experiment, a core was soaked with 18 wt % DAE-1 shale inhibitor. In this case the core survived the 4 hour water flush with virtually no visible erosion.

Example 3

Gelled Treatment Fluids

The shale cuttings used in this test were sieved between 2 and 4 mm sieves. Fifteen grams of the sieved shale were added to 175 mL of test fluid that had been preheated in a 250 mL bottle. The bottle and its contents were then rolled for 16 hours in a heated roller oven after which it was emptied over a 0.5 mm screen. The recovered shale was briefly rinsed with pharmacy 91% isopropyl alcohol (IPA) aqueous solution and allowed to dry at room temperature. The screen with the recovered shale was then heated at 121° C. (250° F.) for a minimum of 21 hours after which it was immediately weighed. After the sieve and its contents cooled down, the recovered shale was resieved through the 2 mm sieve. The objective of this style of reporting is to indicate how much of the original shale was left intact. Unless otherwise mentioned, inhibition (i.e. % inhibition) in this study is reported as the percentage of the original mass of shale recovered on the 2 mm screen. The recovered mass value was corrected for the moisture content of the original shale. The test results are given below in Tables 1-3 for three different gelling agent compositions where GA-A was erucic amidopropyl dimethyl betaine (Table 1), GA-B was docosenyl-N—N-bis(2-hydroxyethyl)methyl ammonium chloride (Table 2), and HEC was hydroxyethylcellulose (Table 3).

TABLE 1

Betaine surfactant gels

| Component/Property | Fluid A1 | Fluid A2 |
|---|---|---|
| Gelling agent | 2.2 wt % GA-A | 2.2 wt % GA-A |
| Electrolyte | $CaCl_2$ | $CaCl_2$ |
| Final density | 1.2 kg/L (10 ppg) | 1.2 kg/L (10 ppg) |
| DAE-1 | none | 2.6 wt % |
| Shale inhibition | 82% | 107% |

TABLE 2

Quaternary surfactant gels

| Component/Property | Fluid B1 | Fluid B2 |
|---|---|---|
| Gelling agent | 0.92 wt % GA-B | 0.92 wt % GA-B |
| Electrolyte | 3 wt % KCl | 3 wt % KCl |
| DAE-1 | none | 3 wt % |
| HCl | none | 0.57 wt % |
| Water | balance | balance |
| Shale inhibition | 5% | 42% |

TABLE 3

HEC gels

| Component/Property | Fluid C1 | Fluid C2 |
|---|---|---|
| Gelling agent | 0.8 wt % HEC | 0.8 wt % HEC |
| Electrolyte | 2.9 wt % KCl | 2.9 wt % KCl |
| DAE-1 | none | 2.9 wt % |
| $NaHCO_3$ | none | 0.2 wt % |
| Water | balance | balance |
| Shale inhibition | 64% | 96% |

The data in Table 1, Table 2 and Table 3 show that adding the DAE-1 inhibitor to the three gelled fluids resulted in an enhancement of inhibition. It can thus be expected that as the formation is exposed to fluids of varying salinity after displacement of the DAE-1 inhibitor solution, the DAE-1 treated formation will continue to retain the water insensitivity imparted by the DAE-1 treatment. Therefore, it can be safe in one embodiment to contact the treatment zone with other fluids that do not contain any polyamine inhibitor or other temporary inhibitors such as KCl, TMAC or the like.

Example 4

VES Fluids

The use of a polyamine shale inhibitor according to the present invention can be used in one embodiment with a VES fluid. However, it has been unexpectedly discovered that the addition of an acid can improve the utility of certain VES's as a rheological modifier. In the following treatment fluids, GA-A1 was GA-A described above supplied in a 34 wt % emulsion. The following treatment fluids were evaluated to investigate this phenomenom:

TABLE 4

VES fluids and acids

| Component/ Property | Fluid D1 | Fluid D2 | Fluid D3 |
|---|---|---|---|
| Gelling agent | 6.5 vol % GA-A1 | 6.5 vol % GA-A1 | 6.5 vol % GA-A1 |
| Electrolyte | 50 vol % 1.39 kg/L (11.6 ppg) $CaCl_2$ | 56 vol % 1.39 kg/L (11.6 ppg) $CaCl_2$ | 56 vol % 1.39 kg/L (11.6 ppg) $CaCl_2$ |
| DAE-1 | none | 5 vol % | 5 vol % |
| Acid | none | none | 25 vol % 1N HCl |
| Water | 43.5 vol % | 32.5 vol % | 7.5 vol % |
| Final density | 1.21 kg/L (10.1 ppg) | 1.2 kg/L (10.1 ppg) | 1.2 kg/L (10.1 ppg) |

Figure 3:
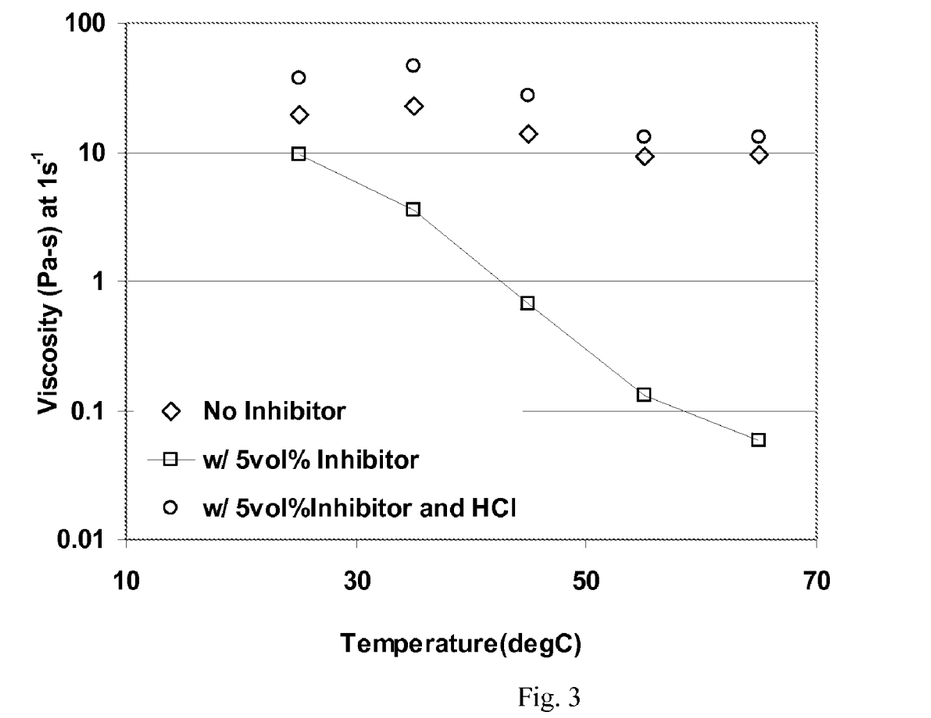
FIG. 3 is a viscosity profile showing the effect of diamine ether inhibitor with and without acid in a betaine VES fluid system as described in Example 4 according to an embodiment of the invention.

The formulations were evaluated for viscosity according to the following procedure: For a given fluid, the components were added and mixed at high shear in a laboratory blender. The fluid was then centrifuged to remove any entrained air. The rheology (viscosity) was measured with a BOHLIN controlled stress rheometer equipped with a cup and bob, also known as Couette geometry, in controlled strain mode, at the desired shear rates. Temperature was controlled using the peltier option of the rheometer. As shown in FIG. 3, the viscosity at 1 l/s declined at increasing temperature when the clay stabilizer DAE-1 was used by itself in Fluid D2, but was stabilized by the presence of the acid added in the formulation in Fluid D3, relative to the VES-only formulation in Fluid D1 without inhibitor or acid. The procedure was repeated with the cationic surfactant GA-2 described above using the following formulations in Table 5.

TABLE 5

VES fluids and acids

| Component/ Property | Fluid E1 | Fluid E2 | Fluid E3 |
|---|---|---|---|
| Gelling agent | 1.5 wt % GA-2 | 1.5 wt % GA-2 | 1.5 wt % GA-2 |
| Electrolyte | 3 wt % KCl | 3 wt % KCl | 3 wt % KCl |
| DAE-1 | none | 3 wt % | 5 vol % |
| Acid | none | none | 15.6 wt % 1N HCl |

Figure 4:
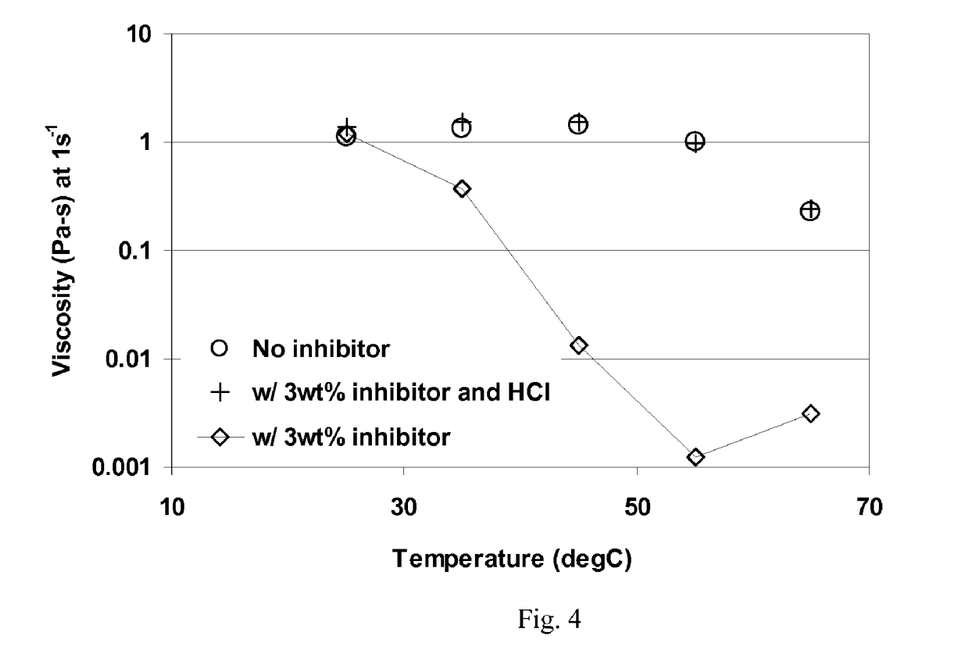
FIG. 4 is a viscosity profile showing the effect of diamine ether inhibitor with and without acid in a cationic VES fluid system as described in Example 4 according to an embodiment of the invention.

From the data shown in FIG. 4, the viscosity at 1 l/s declined at increasing temperature when the clay stabilizer DAE-1 was used by itself in Fluid E2, but was stabilized by the presence of the acid added in the formulation in Fluid E3, relative to the formulation without any inhibitor or acid in Fluid E1. Indeed, the presence of the stabilizer and acid in combination had no measurable effect on the fluid viscosity, in contrast to the inhibitor alone.

The preceding description of specific embodiments of the present invention is not intended to be a complete list of every possible embodiment of the invention. Persons skilled in this field will recognize that modifications can be made to the specific embodiments described here that would be within the scope of the present invention.

We claim:

1. A method comprising:
   contacting a permeable treatment zone in fluid communication between a wellbore and a fluid reservoir with a saline treatment fluid comprising a poly(oxyalkylene) polyamine clay stabilizer for a period of time effective to inhibit fines migration in the treatment zone; and, thereafter displacing a second fluid through the treatment zone between the wellbore and the reservoir, wherein the second fluid entering the treatment zone comprises an aqueous phase essentially free of the clay stabilizer.

2. The method of claim 1 wherein the clay stabilizer comprises a diamine ether of the formula $H_2$—N—R-(O-R')$_x$—$NH_2$ wherein R and R' are alkylene of from 1 to 6 carbon atoms and x has a value from 1 to 10, or an acid addition product thereof.

3. The method of claim 1 wherein the clay stabilizer comprises a diamine ether of the formula or an acid addition product thereof.

4. The method of claim 1 wherein the saline treatment fluid comprises the clay stabilizer in an amount from about 0.1 to about 10 weight percent by weight of the liquid phase.

5. The method of claim 1 wherein the saline treatment fluid is neutralized with an acid to a pH from about 6 to about 8.5.

6. The method of claim 1 wherein the saline treatment fluid comprises a density of at least about 1.2 g/mL.

7. The method of claim 1 wherein the saline treatment fluid comprises potassium chloride.

8. The method of claim 1 wherein the saline treatment fluid comprises tetramethyl ammonium chloride.

9. The method of claim 1 wherein the saline treatment fluid comprises a zwitterionic surfactant of the formula:

wherein $R_1$ is an alkyl, alkylarylakyl, alkoxyalkyl, alkylaminoalkyl or alkylamidoalkyl group, containing from about 12 to about 24 carbon atoms, branched or straight chains, saturated or unsaturated, and $R_2$ and $R_3$ are independently hydrogen or an aliphatic chain having from 1 to about 30 carbon atoms, and $R_4$ is a hydrocarbyl radical having from 1 to 4 carbon atoms.

10. The method of claim 1 wherein the saline treatment fluid comprises a zwitterionic surfactant comprising a betaine moiety and an oleic acid moiety.

11. The method of claim 1 wherein the saline treatment fluid comprises a cationic surfactant.

12. The method of claim 1 wherein the saline treatment fluid comprises from 0.01 to 2 weight percent of a surfactant by total weight of the liquid phase.

13. The method of claim 1 further comprising hydraulically fracturing the formation.

14. The method of claim 1 further comprising hydraulically fracturing the formation wherein a fluid in each of a plurality of fluid injection stages comprises the saline treatment fluid.

15. The method of claim 1 further comprising gravel packing wherein the saline treatment fluid comprises a carrier for the gravel.

16. The method of claim 1 further comprising removing scale from adjacent the formation wherein the saline treatment fluid comprises a scale dissolution agent.

17. The method of claim 1 further comprising removing filter cake from adjacent the formation wherein the saline treatment fluid comprises a filter cake dissolution agent.

18. The method of claim 1 further comprising treating the formation between drilling and gravel placement.

19. The method of claim 1 wherein the saline treatment fluid comprises a prepad or preflush in an operation to treat the formation.

20. The method of claim 1 comprising soaking the treatment zone in contact with the saline treatment fluid for a period of at least one hour.

21. The method of claim 1 wherein the saline treatment fluid is prepared by mixing the inhibitor with an aqueous medium and salt.

22. The method of claim 1 wherein the saline treatment fluid is prepared by mixing the inhibitor with an aqueous medium, salt and an acid.

23. The method of claim 1 wherein the second fluid comprises fluid produced from the reservoir to the wellbore.

24. The method of claim 1 wherein the second fluid comprises fluid injected into the treatment zone from the wellbore.

25. A method for gravel packing a subterranean formation penetrated by a wellbore and containing water-sensitive minerals, the method comprising:
    contacting a permeable treatment zone in fluid communication between the wellbore and a fluid reservoir with a saline treatment fluid comprising a poly(oxyalkylene) polyamine clay stabilizer for a period of time effective to inhibit fines migration in the treatment zone;
    thereafter displacing a second fluid through the treatment zone between the wellbore and the reservoir, wherein the second fluid entering the treatment zone comprises an aqueous phase essentially free of the inhibitor; and,
    placing gravel, sand, or a mixture of the sand and the gravel, in an amount suitable to form a gravel pack in a portion of the formation adjacent the wellbore.

26. A method comprising contacting in a gravel packing operation a permeable treatment zone in fluid communication between a wellbore and a fluid reservoir with a saline treatment fluid comprising a poly(oxyalkylene) polyamine clay stablizer whereby fines migration into the treatment zone is inhibited.

* * * * *